No. 786,421. PATENTED APR. 4, 1905.
H. H. CUTLER.
SYSTEM AND APPARATUS FOR MOTOR CONTROL.
APPLICATION FILED MAR. 31, 1902.
3 SHEETS—SHEET 2.
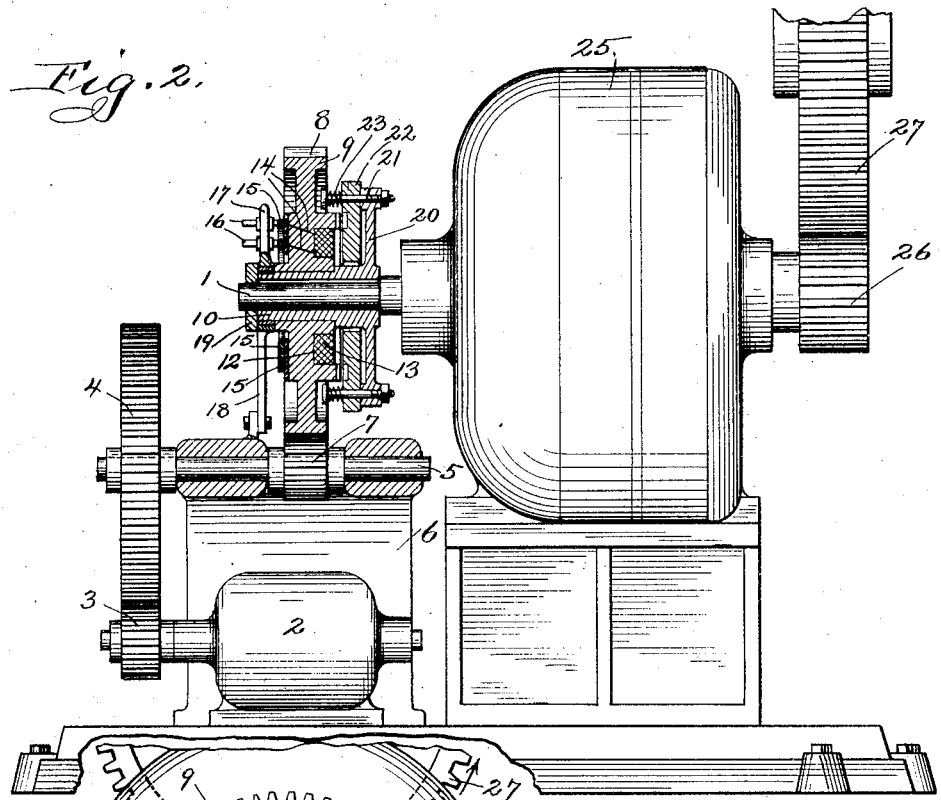
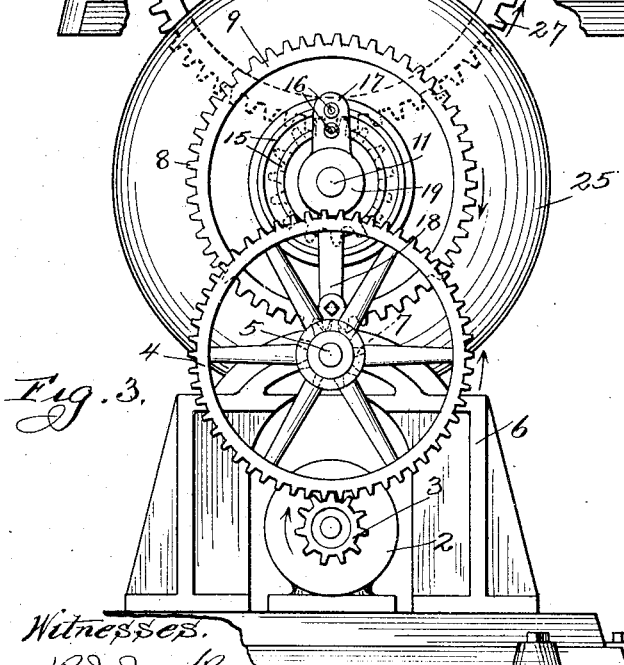
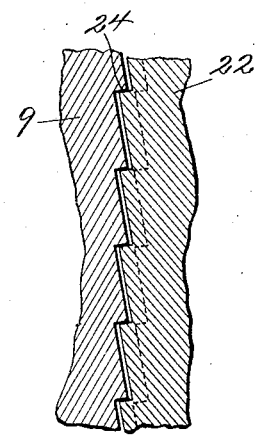
Witnesses.
R. J. Jackler
Robert Lewis Ames.
Inventor:
Henry H. Cutler
By Jones & Addington
Attorneys.

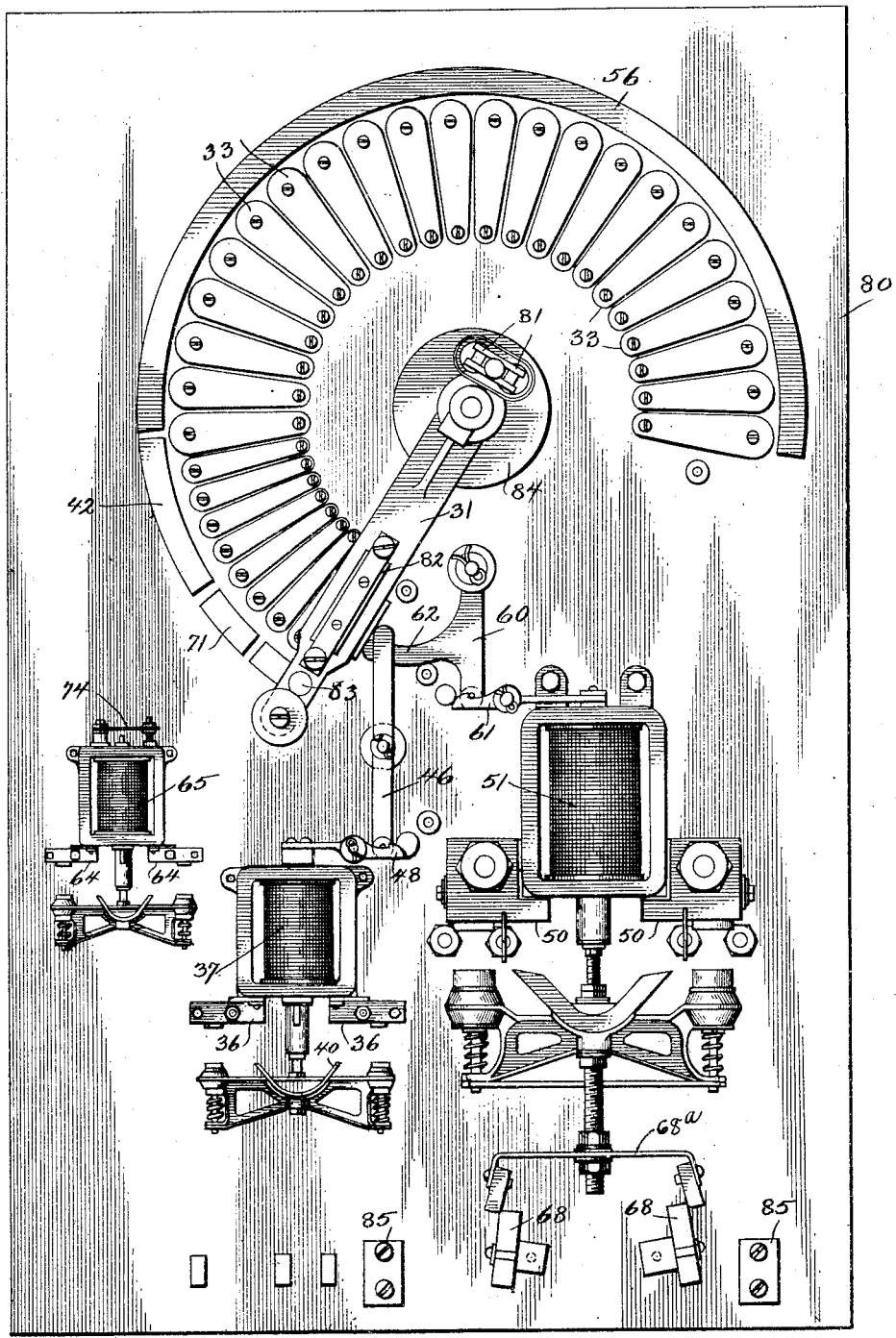

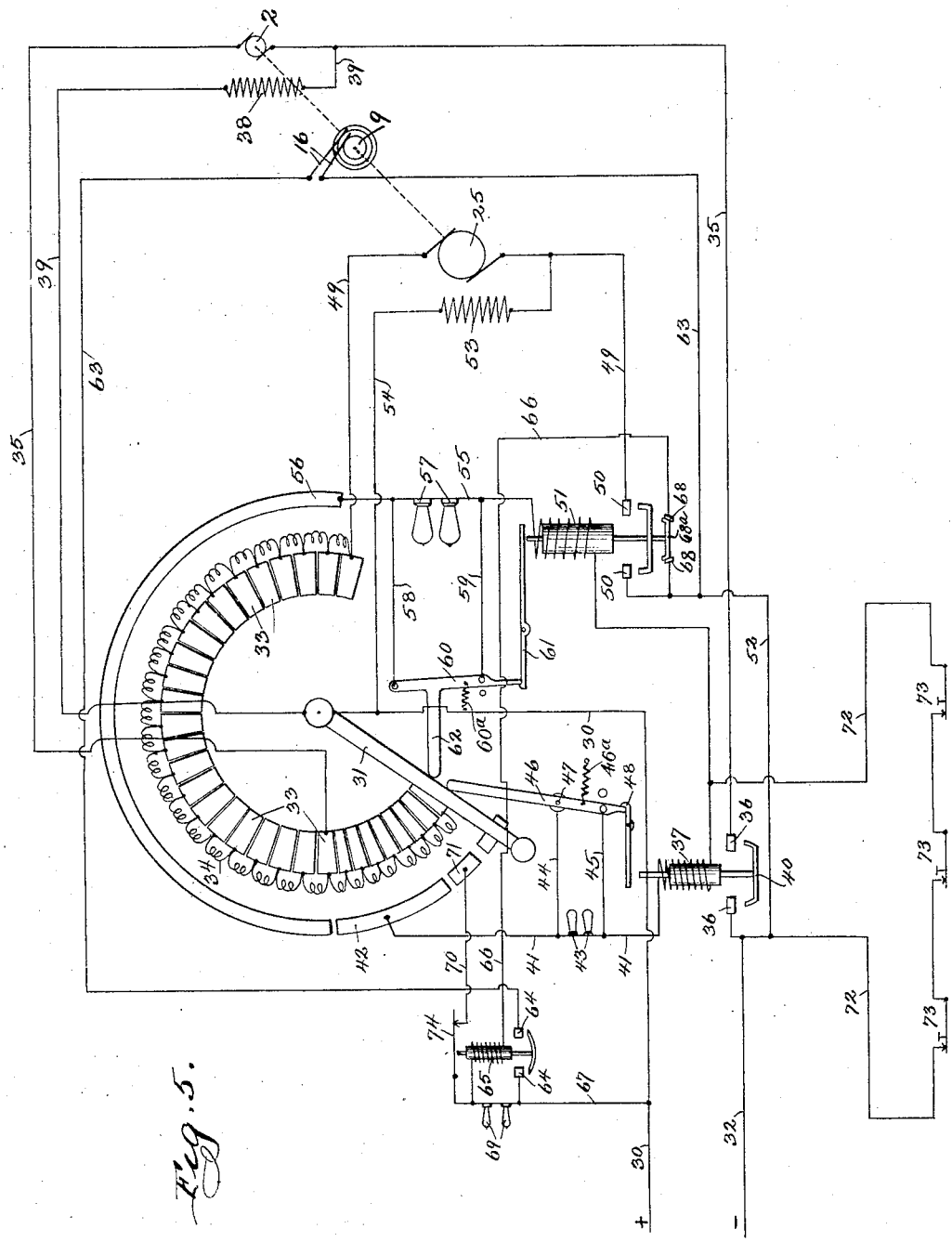

No. 786,421. Patented April 4, 1905.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

SYSTEM AND APPARATUS FOR MOTOR CONTROL.

SPECIFICATION forming part of Letters Patent No. 786,421, dated April 4, 1905.

Application filed March 31, 1902. Serial No. 100,880.

*To all whom it may concern:*

Be it known that I, HENRY H. CUTLER, a citizen of the United States, residing at Milwaukee, in the county of Milwaukee and State of Wisconsin, have invented a certain new and useful Improvement in Systems and Apparatus for Motor Control, of which the following is a full, clear, concise, and exact description, reference being had to the accompanying drawings, forming a part of this specification.

My invention relates to improvements in means and apparatus for controlling and operating machinery by two motors, the idea being to start the machinery through the medium of a small motor and to operate it thereby at any desired slow speed for the purpose of inspection, repair, adjustment, regulation, &c., and to then cause the larger motor to be thrown into action and to operate the machinery at any desired greater speed. Such an apparatus is of especial advantage in operating printing-presses, since it is necessary while placing the stereotype-plates in position and for later threading in the paper to make frequent starts and stops and to turn the rolls over a very small fraction of a revolution. In performing these operations the small motor may be conveniently used, for it is capable of being readily started and stopped. In order to start the press without a jerk, and thereby avoid tearing the paper, it is desirable to have the small motor rigidly connected to the press-shaft, for the reason that if there is any lost motion between them, as would be the case with any ordinary form of mechanical clutch, the small motor would start quickly under no load and then after having made probably a revolution the clutch would take hold and start the press with more or less of a jerk. Where ratchet-clutches are used for the purpose, it is necessary to issue instructions to the attendants to first turn the motor by hand until the pawls and ratchet-teeth of the clutch are in engagement before starting the motor. This results in considerable trouble, besides it is practically impossible to compel the attendants to pay any attention to such directions. In my invention I accomplish the desired result by providing a magnetic clutch between the small motor and the press which is preferably arranged to be continuously energized during the time that it is desired to operate the press by the small motor whether the said motor be running or not. This forces the small motor to start under a load and to stop as soon as the current is shut off, whereby lost motion between the motor and press is prevented.

A further object is to provide a compact arrangement of the motors and gearing for operating the machinery in the above-described manner, whereby they may all be mounted upon a single base and in small space. Arrangement is also made to start the large motor directly by the small motor, the large motor being directly connected with the machinery, whereby the clutch and reducing-gears may be placed intermediate the motors.

The invention further comprises the novel construction and arrangement hereinafter described, and particularly pointed out in the appended claims.

In the accompanying drawings, which illustrate one form of my invention, and in which the same reference characters designate like parts throughout the several views, Figure 1 is a view of the controller-switch upon which the rheostat and the several controlling-switches are mounted. Fig. 2 is an elevation of the clutch and motors, the clutch being shown in section. Fig. 3 is an end elevation thereof. Fig. 4 is a sectional view through the ratchet-teeth of the clutch, showing the formation thereof and Fig. 5 is a diagram of the circuits employed in this system.

Referring to Fig. 2, the numeral 2 indicates the small motor, the pinion 3 of which meshes with a gear 4, mounted upon a counter-shaft 5, which is journaled in suitable bearings in a standard or support 6, beneath which the small motor is placed. Upon the motor-shaft 5 a pinion 7 is fixed, which meshes with a gear 8, formed upon the outer periphery of the driving member 9 of the clutch, which rides loosely upon a sleeve 10, keyed to the large motor-shaft 11. An annular channel 12 is formed in one face of the driving member 9, in which the magnet-coil 13 of the clutch is located, suitable connecting-wires 14 being led therefrom to the contact-rings 15, carried upon the opposite face of said clutching member. Brushes 16 are carried upon an arm 17, also journaled upon the sleeve 10 and supported steadily in position by means of the downwardly-extending arm or arms 18. These brushes are suitably insulated from each other and connected with the terminals of the electric circuit from which current is drawn to energize the magnet-coil 13 to actuate the clutch. A suitable washer or nut 19 is provided upon the end of the shaft to hold the above-mentioned parts in position. At the opposite end of the sleeve 10 a disk or radial arms 20 are provided, which carry pins 21, upon which the driven member of the clutch 22 is carried. Coiled springs 23 are placed between the outer ends of the pins or bolts 21 and the face of the plate 22. Ratchet-teeth are formed in the face of the plate 22 and are adapted to engage with corresponding ratchet-teeth formed upon the face of the driving member 9 when the magnet-coil is energized. These teeth are formed substantially as shown in Fig. 4, the angle of the driving edges 24 being such that when the clutch is in operation and the member 9 is driving the member 22 the strength of the coiled springs 23 is not sufficient to force the plate 22 out of engagement with the member 9 but as soon as the member 22 advances or increases its speed over that of the member 9 the springs 23 will immediately throw the disk 22 out of engagement with the member 9, and thereby entirely disengage the teeth. This would occur of course when the press has been operating by the small motor and the large motor is then connected. The small motor will continue to drive the press until the torque of the large motor increases sufficiently to cause it to operate the plate 22 faster than the plate 9. The large motor 25 is directly connected with the shaft 11 and is provided upon the opposite end of its shaft with a pinion 26, which meshes with a gear 27, connected directly with the press or other machinery in any suitable manner. It is apparent, therefore, from Figs. 2, 3, and 4 that when the small motor and the clutch are connected the large motor and the press or other machinery will be driven by the small motor and that the large motor may be energized and operated at the time of cutting off the small motor or slightly before and will take up the work thereof. The large motor will then increase the speed of and drive the press at the desired rate, and all of this will be accomplished smoothly and without sudden shocks or jars. By connecting the large motor directly with the press the clutch and intermediate gearing can be placed between the two motors, and all the apparatus can be located upon the same base 90.

Referring to Fig. 5, the circuits which I prefer to use are here shown. The positive side 30 of the power-circuit connects directly with the hub of the rotating arm 31 of the controlling-rheostat. The armature-circuit of the small motor 2 extends from one of the contacts 33 of the resistance 34 by means of a conductor 35, which is continued upon the opposite side of the motor 2 to the contacts 36 of the controlling-switch 37 and thence to the negative 32 of the power-circuit. The shunt-winding 38 of the motor is completed from the hub of the lever 31, by means of conductor 39, to the opposite side of the armature-circuit. The controlling-switch 37 has a bridging-contact 40, adapted to connect together the contacts 36, and thus complete the armature and shunt circuits of the motor 2. The solenoid-winding of the switch 37 is connected upon one side by means of conductor 41 with the contact-segment 42 of the rheostat, said conductor including the resistance-lamps 43, which are normally shunted by means of conductors 44 and 45 and a lever 46, pivoted at 47 and normally engaged by a catch 48 to hold it in the position shown against the tension of a suitably-adjusted spring $46^a$ tending to move it out of connection with the conductor 45. The upper end of the lever 46 is automatically returned to its normal position by means of the operating-arm 31 when the said arm is returned to its initial position. The armature-circuit of the large motor is completed from the last segment 33 of the series over conductor 49 to contacts 50 of its controlling-switch 51, thence by the way of conductor 52 to the negative side 32 of the power-circuit. The shunt-winding 53 of this motor is in a conductor 54, leading from the hub of the arm 31 or the positive side of the power-circuit to the conductor 49 between the motor 25 and the switch 51. The operation of switch 51, therefore, closes the shunt and armature circuits of the large motor. The solenoid of the larger controlling-switch is connected by a conductor 55 with the contact-segment 56 of the rheostat and includes the lamps 57, normally shunted by conductors 58 and 59 and the lever 60, the latter being held in the position shown against the tension of a suitably-adjusted spring $60^a$ by means of the catch 61, adapted to be operated by the solenoid-core 51 when the solenoid is energized. The lever 60 is provided with an arm 62, which is engaged by the resistance-arm 31 when the arm is returned to its initial position to move said lever into connection with the conductor 59 and in position to be engaged by the catch 61. The opposite terminals of the windings 37 and 51 are connected, by means of a conductor 72 through the switches 73, to the negative side 32 of the power-circuit. The clutch 9 is in a conductor 63, leading from the negative side of the power-circuit by way of the conductor 52 to one of the contacts 64 of the clutch-controlling switch 65 and thence by way of conductor 67 to the opposite side of the power-circuit. The winding of the switch 65 is in a conductor 66, connected with contacts 68 of the switch 51, said contacts being bridged together by a contact 68ᵃ of said switch 51 when the same is not operated. The resistance-lamps 69 are in circuit with the winding 65, and the conductor 70 extends from one side of the same to the segment 71 of the controlling-rheostat, which is in the path of a suitable brush carried upon the end of the arm 31. Switch-contacts are arranged in this conductor 70 to be opened by the core of the solenoid 65 when the solenoid is energized.

The operation is as follows: The arm 31 in its movement clockwise first engages the segment 71 and short-circuits the lamps 69 in the path of current through the coil of the switch 65, thus permitting sufficient current to flow through said coil to lift its core and bridge the contacts 64. This circuit may be traced from the positive side of the line 30, arm 31, contact 71, conductor 70, switch 74, winding of the switch 65, conductor 66, contacts 68ᵃ and 68 of the switch 51, and conductor 52 to the negative side of the power-circuit. As soon as the solenoid is lifted the switch 74 is opened, thus opening the low-resistance path to the positive side of the power-circuit, the only remaining path being through the conductor 67 and lamps 69. This permits sufficient current to flow to maintain the core lifted, but is not sufficient to lift the core when it is in its normal position. The clutch-circuit is now closed over conductor 67, contacts 64 of switch 65, and conductors 63 and 52 to the negative side of the power-circuit. This circuit remains closed until the switch 51 is operated, which opens it at the contacts 68ᵃ and 68. In the further rotation of the arm 31 its outer brush engages the segment 42 and closes the circuit of the controlling-switch 37 of the small motor, this circuit being from the positive side of line through the switch-arm 31, segment 42, conductor 41, wire 37, conductor 72, through the switches 73 to the negative side of said power-circuit. As soon as the solenoid is lifted it engages the catch 48 and permits the lever 46 to open the shunt about the lamps 43, thus cutting them into the circuit, and while permitting sufficient current to flow through the solenoid to maintain it operated it is unable to lift the core after its circuit is once opened. The small motor-circuit is now completed between the two sides of the power-circuit through conductors 35 and 39 and the switch-contacts of the switch 37. During this operation of the small motor the clutch is continuously energized, as above described, and the press may be stopped as desired by any of the switches 73, which are conveniently located at handy points about the press. As the arm 31 is rotated further it passes to the contact-segment 56 and closes the circuit of the switch 51 of the large motor, which operates in a manner similar to that described with reference to the switch 37 and in so operating opens at contacts 68ᵃ and 68. The circuit of the clutch-controlling switch 65 thus causes the latter to be deënergized, which opens the circuit of the clutch and releases the small motor. During the further movement of the arm 31 the resistance in the armature-circuit of the large motor is cut out and its speed gradually increases to the desired limit. The large motor may be stopped by operating any of the switches 73 to open the circuit of the controlling-switch 51 and which cannot again be operated, even though the switches 73 are immediately closed on account of the resistance of the lamps 57 in its circuit.

Fig. 1 shows the arrangement of the controller-switches and rheostat upon a single insulating-base 80, which may be of slate, marble, or other suitable material. The arm 31 is provided with suitable brushes 81, 82, and 83 to engage the contacts 84 and 33 and segments 71, 42, and 56. The levers 60 and 46 are engaged by a plate carried upon the side of the arm 31 and are normally forced away from the position shown by means of suitable pivot or other springs. The several switches 65, 37, and 51 are of the usual construction and are mounted upon the base in the desired location, preferably as shown. The switch 65 is provided with the usual switch actuated by the solenoid-core, while the switches 37 and 51 actuate the catches 48 and 61. The latter switch, 51, carries an additional bridging-contact 68ᵃ, which engages with suitable stationary contacts 68. Binding-posts, such as 85, are provided to connect the circuit-wires with the apparatus mounted upon the base. The several parts and the posts are suitably connected together by means of wires placed in grooves formed in the back of the slab and are preferably cemented therein by some suitable insulating substance, all in the usual and ordinary manner.

It will thus be seen that I have provided an apparatus for operating presses or other machinery by means of the small and large motors which is efficient and reliable in operation, convenient to manipulate, and which is compact and self-contained and requires but little room.

Having described my invention, what I claim as new, and desire to secure by Letters Patent, is—

1. The combination with a suitable base, of a large motor mounted thereon and connected with the machinery to be operated, a clutch mounted upon the shaft of said motor, a counter-shaft located beneath the shaft of the motor and connected with said clutch by gears, and a small motor located beneath the motor-shaft and connected with the same by means of intermediate gearing and also mounted upon said base, substantially as described.

2. The combination with a pair of motors adapted to operate a single machine, of a magnetic clutch therefor, a rheostat, a separate electrically-operated switch for each motor and for the clutch, and means to control said switches in order from the rheostat, substantially as described.

3. The combination with a pair of motors adapted to drive machinery, a magnetic clutch associated therewith, a rheostat, a solenoid-switch for each motor and for the clutch and controlling the continuity of their circuits, and means for operating said switches from the rheostat, substantially as described.

4. The combination with a small motor and a large motor, of a magnetic clutch, a rheostat having a movable element, said element in one position serving to cause the operation of said clutch and small motor and in another position to cause the operation of the large motor and render inoperative the clutch and small motor, substantially as described.

5. The combination with a plurality of electric motors, of a rheostat for said motors, magnetically-operated switches controlling the continuity of the circuits of said motors, means for preventing the operation of said switches after the circuits controlled thereby have been once closed until the movable element of said rheostat has been returned to its initial position, and a clutch for connecting one of said motors with the machine to be operated.

6. The combination with a plurality of electric motors, of a rheostat for said motors, a magnetic clutch for connecting one of said motors with the machine to be operated, magnetically-operated switches for controlling the continuity of the circuits of said motors and said clutch, and means for preventing the operation of the switches of the circuits for said motors after the circuits controlled thereby have been once closed until the movable element of said rheostat has been returned to its initial position.

7. The combination with a plurality of electric motors, of a rheostat for said motors, a magnetic clutch for connecting one of said motors with the machine to be operated, magnetically-operated switches for controlling the continuity of the circuits of said motors and said clutch, means for preventing the operation of the switches of the circuits for said motors after the circuits controlled thereby have been once closed until the movable element of said rheostat has been returned to its initial position, and means for opening any of said circuits from a distant point.

8. The combination with a plurality of electric motors, of a rheostat therefor having a movable element, a clutch for connecting one of said motors with the machine to be operated, magnetically-operated switches for controlling the continuity of the circuits of said motors and said clutch, means for successively operating said switches when the movable element of said rheostat is manipulated to adjust the resistance in circuit, and means for preventing the operation of the switches of the circuits for said motors after the circuits controlled thereby have been once closed until the movable element of said rheostat has been returned to its initial position.

9. The combination with a large motor for driving a suitable machine, of a small motor, a magnetic clutch for connecting said small motor with said machine, a rheostat for said motors, magnetically-operated switches for controlling the continuity of the circuits of said motor and said clutch, means for successively operating said switches to close their respective circuits when the movable element of said rheostat is manipulated to adjust the resistance in circuit, means for preventing the operation of the switches of the circuits for said motors after the circuits controlled thereby have been closed until the movable element of said rheostat has been returned to its initial position, and a switch for opening said circuits from a distant point.

10. The combination with a suitable base, of a large motor mounted thereon and having its shaft on one side suitably geared to the machinery to be driven, a clutch on the opposite side of said motor, a counter-shaft geared to said clutch, and a small motor also mounted upon said base and suitably geared to said counter-shaft.

11. The combination with a suitable base, of a large motor mounted thereon and connected with the machinery to be driven, a small motor also mounted upon said base, the shafts of said motors being suitably geared to an intermediate shaft, and a clutch interposed between said motors having its members adapted to be automatically disengaged when the speed of said large motor becomes greater than that of the small motor.

In witness whereof I have hereunto subscribed my name in the presence of two witnesses.

HENRY H. CUTLER.

Witnesses:
W. CLYDE JONES,
ROBERT LEWIS AMES.